May 27, 1958
G. H. COTTER
2,836,705
WELDING GUN
Filed March 27, 1956
2 Sheets-Sheet 1
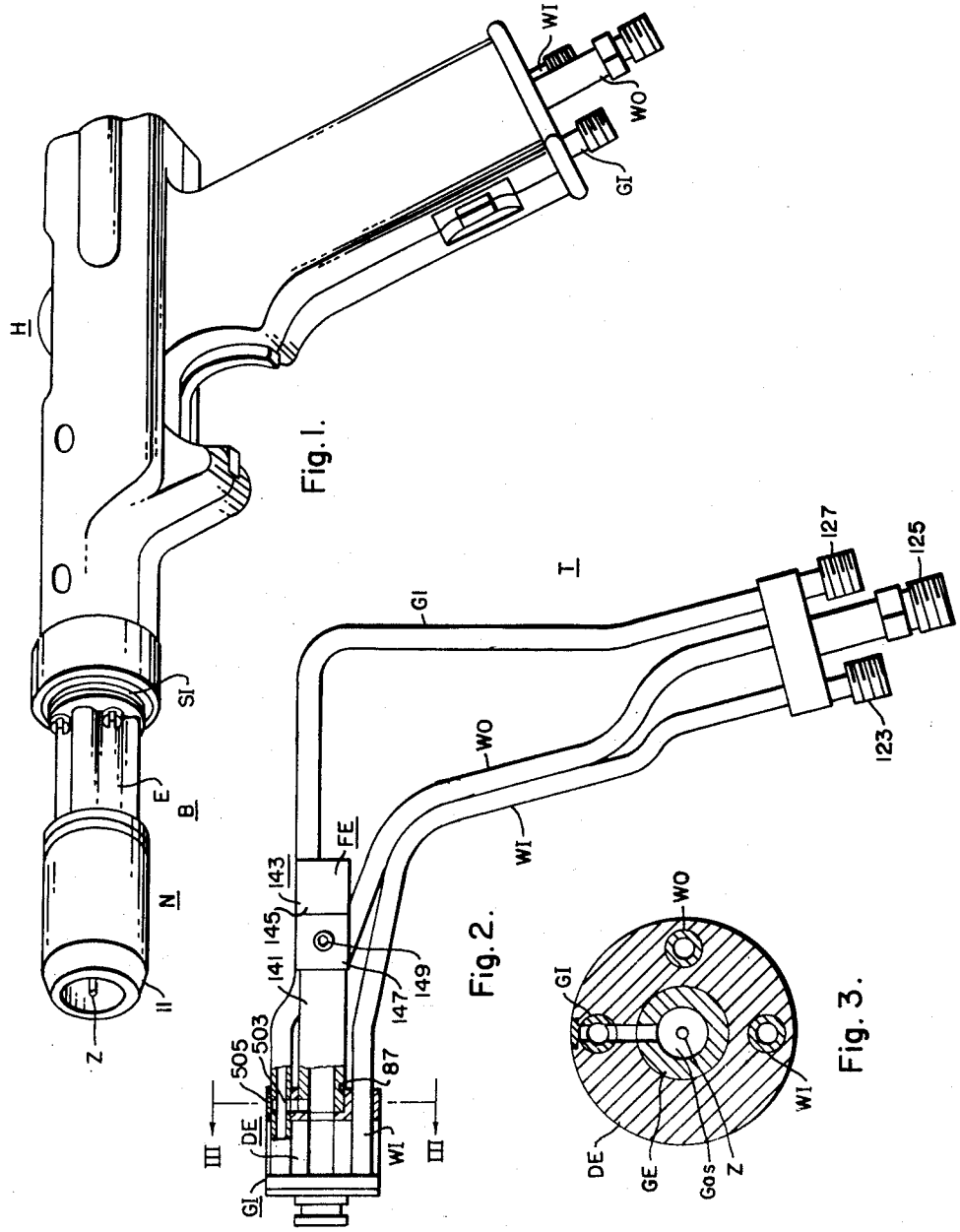
WITNESSES:
Bernard R. Gieguey
Leroy M. Garman
INVENTOR
George H. Cotter
BY
Hyman Diamond
ATTORNEY May 27, 1958 G. H. COTTER 2,836,705
WELDING GUN
Filed March 27, 1956 2 Sheets-Sheet 2
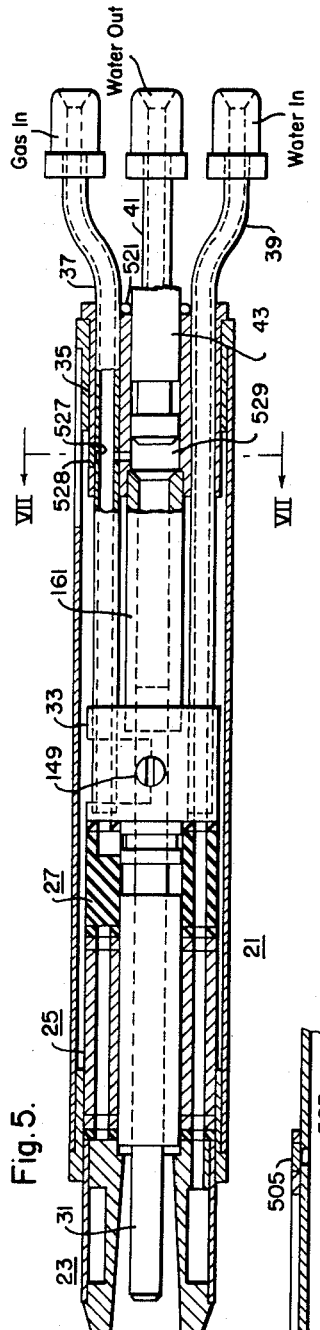
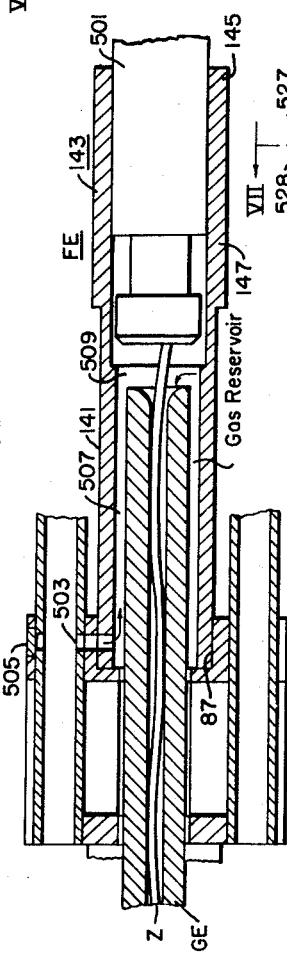
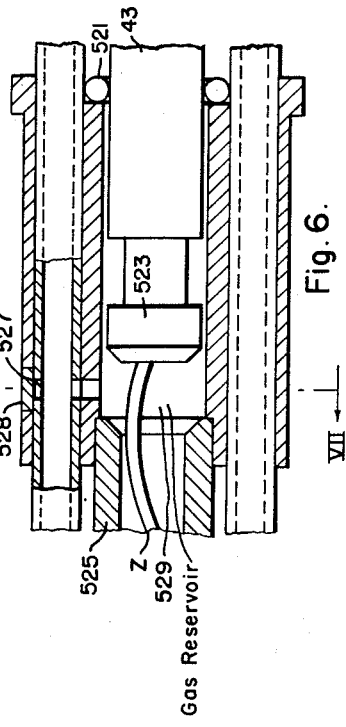
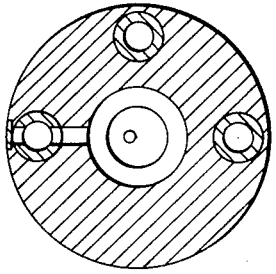

ated May 27, 1958

2,836,705

WELDING GUN

George H. Cotter, Springville, N. Y., assignor to Westinghouse Electric Corporation, East Pittsburgh, Pa., a corporation of Pennsylvania Application March 27, 1956, Serial No. 574,172

4 Claims. (Cl. 219—130)

This invention relates to welding guns and has particular relation to welding guns for welding with a consumable electrode in a shield of a non-reactive gas such as a noble gas or carbon dioxide. This invention arises out of experience gained with the gun disclosed in application Serial No. 465,508, filed October 29, 1954, to Joseph F. Miller (herein called Miller application). A gun embodying this invention in certain of its aspects is also shown in application Serial No. 550,106, filed November 30, 1955, to Harry J. Bichsel (herein called Bichsel application).

The Miller gun has on the whole proved itself highly satisfactory. But it was found that some welds made with the gun, and particularly aluminum and aluminum alloy welds and mild steel welds, are porous. The porosity in the aluminum was particularly marked and in certain situations the welds produced were extremely inacceptable. An investigation of the porosity revealed that it could be caused by atmospheric gas carried through the gun into the arc plasma by the electrode and the atmospheric gun aspirated into the plasma through the rear of the gun because of the reduced pressure, or partial vacuum created by the shielding gas passing through the nozzle. This atmospheric gas which includes oxygen, nitrogen and water vapor passes through the nozzle and deteriorates the gas shield, producing irregularities in the arc.

In accordance with the teachings of the prior art, an attempt has been made to suppress the tendency of the atmospheric gas to flow into the plasma by bleeding gas from the shielding gas tube onto the electrode (see Baird Patent 2,510,205). It was thought that this gas would have a tendency to suppress the flow of the atmospheric gas through the electrode channel to the nozzle. This expedient has not proved satisfactory and it is broadly an object of this invention to provide a welding gun for welding with a consumable electrode in a non-reactive gas shield in the use of which the aspiration of atmospheric gas by the electrode into the nozzle shell be effectively suppressed.

This invention arises from the realization that the prior art means of suppressing the aspiration of atmospheric gas is not satisfactory because of the varying relationship between the electrode and the opening through which the shielding gas is projected towards the electrode. In a gun of the type under consideration the electrode does not, and for the proper operation of the gun must not, move along a straight line, but must have a curvature or set. Both the radius and the spacial relationship of this curvature with reference to the opening through which the gas is bled change continuously. As the electrode moves past this opening then, the distance between the electrode and the opening varies and the pressure of the gas projected onto the electrode varies. This has a tendency to produce variations in the density of the shielding gas and as a result in the ionization of the arc and to cause the arc to fluctuate markedly. The turbulence thus produced has a deleterious effect on the welding. In addition, the electrode in the prior art apparatus at times comes into contact with the opening through which the shielding gas is projected and foreign material and flakes on the electrode tend to block the opening and thus to prevent the flow of shielding gas onto the electrode altogether.

In accordance with this invention, shielding gas is bled from the gas supply tube but this is not projected onto the electrode but is guided into what is in effect an expansion chamber in the region of the end of the electrode guide tube or bushing remote from the nozzle and in effect saturates this region. The gas from the saturated reigon seeps through the guide tube or bushing adjacent the electrode and both the gas in the region and the gas seeping along the electrode suppress the flow of atmospheric gas. The opening through which the shielding gas is in accordance with this invention supplied is further so disposed as not to be affected at all or to be affected only inappreciably by the changing curvature in the electrode as it moves through the gun. In addition, the opening is so disposed that the electrode cannot come into contact with it and plug it.

This invention in its specific aspects is applied to the Miller gun. In this embodiment of the invention an opening is drilled through the gas inlet tube (GI, Fig. 3—Miller) and the transversely aligned portions of the header (DE, Fig. 9—Miller application) and the tube (141, Fig. 6—Miller) into which the electrode guide tube (GE) extends. The portion of this opening in the external wall of the header is plugged. During the welding operation shielding gas is bled from the gas tube into the space between the electrode guide tube and the electrode through this opening. This gas collects in a reservoir in the region of the end of the electrode guide tube remote from the nozzle and seeps along the electrode towards the nozzle suppressing the flow of atmospheric gas. The electrode is separated from the opening through which the shielding gas is bled by the electrode guide tube, and thus the bleeding is not affected by the fluctuations of the electrode and the electrode does not tend to plug the hole.

The invention in its specific aspects is also applied to an automatic gun as shown in the Bichsel application. In this case the opening is drilled through the gas inlet tube (37, Fig. 5—Bichsel application) and through the transversely aligned portions of the rear header (35, Bichsel application) and the portion of this opening in the external portion of the rear header is plugged. The opening is preferably disposed at a point so disposed along the header that it extends into the region between the end of the electrode bushing or cable and the bushing (161, Figs. 1 and 2—Bichsel application) which receives the electrode guide tube (31, Figs. 1 and 2—Bichsel application.) This space is saturated and from it gas seeps along the electrode. This space is so narrow that the fluctuations of the electrode do not affect the flow of gas from the opening and the electrode is prevented from coming into contact with the opening by the bushings.

The novel features considered characteristic of this invention are described generally above. The invention itself, both as to its organization and its manner of operation, together with additional objects thereof, will be understood from the following description of specific embodiments when read in connection with the accompanying drawings, in which:

Figure 1 is a view in perspective showing a manual gun in accordance with this invention;

Fig. 2 is a view in elevation showing the gas supply and cooling water supply assemblies or manifolds of a gun in accordance with this invention;

Fig. 3 is a view in transverse section taken along line III—III of Fig. 2;

Fig. 4 is a view in longitudinal section of a portion of Fig. 2 enlarged, and showing in addition to the components shown in Fig. 2 the electrode guide tube and the electrode bushing;

Fig. 5 is a view in longitudinal section of an automatic gun in accordance with this invention;

Fig. 6 is a view in longitudinal section of a portion of the gun shown in Fig. 5 enlarged emphasizing the essential features of this invention; and Fig. 7 is a view in transverse section taken along line VII—VII of Fig. 5.

The gun shown in Figs. 1, 2, 3 and 4 is similar to the Miller gun but embodies the invention disclosed in this application. The gun shown in Figs. 5, 6 and 7 is similar to the Bichsel gun embodying the invention disclosed in this application. In the following discussion, only those parts shown in the drawings which concern the invention disclosed in this application will be described in detail. For an understanding of the detailed structure and operation of the Miller and Bichsel guns, reference is made to the Miller and Bichsel applications. To help in the understanding of this invention and its relationship to the inventions disclosed in the Miller and Bichsel applications, the labelling of the Miller and Bichsel applications will be adopted in labelling the parts common to the Miller and Bichsel guns and to the guns shown in Figs. 1 through 4 and 5 through 7, respectively.

The gun shown in Figs. 1 through 4 includes a barrel B, a butt-like housing H and a gas and cooling water manifold assembly T. The barrel B includes a nozzle assembly N to which is secured a metallic extension E, an insulating spacer SI and a header DE (Fig. 2). A gas inlet tube GI extends into the header DE passing shielding gas through it to the nozzle 11. In addition, water inlet and water outlet tubes WI and WD extend through the header DE communicating with the nozzle assembly N and supplying cooling water through it.

A flexible conduit receptacle FE is secured in a central opening 87 in the header DE. This assembly includes a tube 141 from which a receptacle block 143 extends. This block 143 is of generally step form including a central section 145, through which there is an opening communicating with the tube 141, and a projecting portion 147. A flexible electrode cable bushing 501 extends through the receptacle 143 and is held in the section 147 by a set screw 149.

An electrode guide tube GE extends through the barrel B from a point within the tube 141 adjacent to the end of the electrode cable bushing 501 (Fig. 4) to a point in the nozzle 11. This guide tube GE is held by a clamping mechanism (not shown) secured to the header DE by a set screw (not shown).

In accordance with this invention, a small opening 503 is drilled through the header DE, the gas tube GI and the tube 141. A plug 505 is welded into the portion of this opening extending through the outer surface of the header DE.

During welding, an electrode Z is passed through the bushing 501 into the electrode guide tube GE and thence through the nozzle 11 and gas is supplied through the tube GI. A portion of this gas is bled through the opening 503 and flows through the space 507 (Fig. 4) between the electrode guide tube GE and the tube 141, to the region 509 behind the electrode guide tube GE, building up a reservoir in this region which seeps through the guide tube GE along the electrode Z and suppresses the flow of atmospheric gas by the electrode Z. The electrode Z is separated from the opening by the guide tube GE and thus does not affect the flow of gas through the opening and does not tend to inject foreign matter into the opening so that it becomes plugged.

In a gun which has been made and found to operate satisfactorily, the inside diameter of the gas inlet tube GI is 1/8", the hole 503 has a diameter of .052" and the opening 509 has a diameter of 17/64" which is between .015" and .016" greater than the outside diameter of the guide tube GE. The total volume of the reservoir is about 1/10 cubic inch. The pressure in the reservoir at the instant when the flow of gas is started is about 1½ inches of water above atmospheric and this drops to about ½ inch of water above atmospheric during operation.

The embodiment of this invention shown in Figs. 5 through 7 is an automatic welding gun comprising a cylindrical housing assembly 21, a nozzle assembly 23, a conducting extension 25, an insulating spacer 27, an electrode guide tube 31, an inner header 33 in which the electrode guide tube is held by a set screw 149 and a clamping assembly (not shown) and an outer header 35 in the form of a cylindrical block. The header 35 has openings for tubes 37 and 39 and 41 which pass shielding gas and cooling water respectively to the nozzle assembly 23 and a central opening into which a guide bushing 43 extends. Another bushing 161 extends between the bushing 43 and the electrode guide tube 31, the guide tube extending into the bushing 161. The electrode is passed into the gun through the bushing 43 and passes through the bushing 161 into the guide tube 31, whence it is passed through the opening in the nozzle assembly 23. The opening into which the guide bushing 43 is inserted is sealed by an O-ring 521. The inner end 523 (Fig. 6) of the guide bushing is spaced a short distance from the end 525 of the bushing 161.

An opening 527 of small diameter is drilled through the outer header 35 and through the gas tube 37 in the region of the space 529 between the bushing 43 and the bushing 161. The portion of this opening in the outer surface of the header 35 is sealed by a plug 528.

When during welding gas is suppled through the gas tube 37, a portion of this gas is bled into the space 529 between the tubes 43 and 161 and builds up a reservoir in this space suppressing the flow of atmospheric gas to the welding nozzle by the electrode Z. The space between the tubes 43 and 161 is so narrow compared to the radius of curvature of the electrode Z that the fluctuations in the curvature of the electrode do not affect the bleeding of the gas into the reservoir. Further, because this space 529 is narrow, the electrode cannot come into contact with the mouth of the opening and plug it.

In welding with the guns shown in Figs. 1 through 4 and 5 through 7, I have consistently made sound non-porous welds of aluminum and its alloys, of mild steel and of other materials. Thus, success has been achieved because in both guns the opening through which the gas that blocks the flow of atmospheric gas into the nozzle is bled is so disposed and so related to the components of the guns that it effectively blocks the flow of gas without producing irregularities in the arc. The invention thus makes available a gun well suitable for the welding of such metals of all types but particularly aluminum and its alloys and steel.

While specific embodiments of this invention have been disclosed, many modifications thereof are feasible. The invention therefore is not to be restricted except as is necessitated by the spirit of the prior art.

I claim as my invention:

1. A welding gun for welding with a consumable electrode in a gas shield including a nozzle through which said electrode and said gas are passed, an electrode guide tube extending through said gun to said nozzle for guiding said electrode, another tube enclosing at least a portion of said electrode guide tube near the end thereof remote from said nozzle, a gas tube adjacent said other tube and a gas communication connection between said gas tube and said other tube whereby gas from said gas tube flows into said other tube and through it to the region behind said electrode guide tube where the electrode enters the guide tube saturating said region and suppressing the flow of atmospheric gas into said nozzle.

2. A welding gun for welding with a consumable electrode in a gas shield including a nozzle through which said electrode and gas are passed, a header at the end of said gun remote from said nozzle, said header being adapted to receive an electrode lead-in bushing for leading an electrode into said gun, another bushing extending between said header and nozzle for receiving said electrode from said lead-in bushing, a gas tube extending through said header for transmitting gas to said nozzle, and a gas communication connection from said gas tube to the inside region of said header, said communication connection connecting the gas tube to the region between said bushings whereby gas from said gas tube flows into said header to the region behind said other bushing where the electrode enters said other bushing saturating said region and suppressing the flow of atmospheric gas into said nozzle, the distance between the ends of said lead-in bushing and said other bushing, which are face to face, being small compared to the arcs of curvature of said electrode as it moves between said bushings so that changes in the curvature of the electrode do not affect the flow of gas through said connection and the electrode does not block the opening in said connector.

3. A welding gun for welding with a consumable electrode in a gas shield including a nozzle through which said electrode and said gas are passed, channel means through which the electrode is passed to said nozzle, a gas tube for transmitting gas to said nozzle, and a connection between said gas tube and said channel for transmitting gas to saturate the region of said channel where it is entered by the electrode to suppress the flow of atmospheric gas into said channel, said connection including an opening in said gas tube, a tubular means in said channel, and means mounting said tubular means cooperative with said opening so that said tubular means prevents said electrode from contacting said opening or the changes in curvature in said electrode from varying substantially the flow of gas through said opening.

4. A welding gun for welding with a consumable electrode in a gas shield including a nozzle through which said electrode and said gas are passed, channel means through which said electrode is passed to said nozzle, a gas tube for transmitting gas to said nozzle, and a connection between said gas tube and said channel for transmitting gas to saturate the region of said channel where it is entered by the electrode to suppress the flow of atmospheric gas into said channel, said connection including an opening in said gas tube, a tubular means in said channel, and means mounting said tubular means so that said tubular means physically separates said electrode from said opening.

References Cited in the file of this patent

UNITED STATES PATENTS

| | | |
|---|---|---|
| 2,510,205 | Baird | June 6, 1950 |
| 2,586,140 | Anderson | Feb. 19, 1952 |
| 2,606,267 | McElrath | Aug. 5, 1952 |
| 2,628,301 | Dahl | Feb. 10, 1953 |
| 2,680,181 | Tuthill | June 1, 1954 |